United States Patent
Tian et al.

(10) Patent No.: US 11,048,926 B2
(45) Date of Patent: Jun. 29, 2021

(54) ADAPTIVE HAND TRACKING AND GESTURE RECOGNITION USING FACE-SHOULDER FEATURE COORDINATE TRANSFORMS

(71) Applicant: LITEMAZE TECHNOLOGY (SHENZHEN) CO. LTD., Shenzhen (CN)

(72) Inventors: Yibin Tian, Mountain House, CA (US); Jingfeng Li, Hangzhou (CN); Wei Chen, Hangzhou (CN)

(73) Assignee: LITEMAZE TECHNOLOGY (SHENZHEN) CO. LTD., Shenzhen (CN)

( * ) Notice: Subject to any disclaimer, the term of this patent is extended or adjusted under 35 U.S.C. 154(b) by 151 days.

(21) Appl. No.: 16/531,615

(22) Filed: Aug. 5, 2019

(65) Prior Publication Data

US 2021/0042510 A1 Feb. 11, 2021

(51) Int. Cl.
  *G06K 9/00* (2006.01)
  *G06K 9/62* (2006.01)

(52) U.S. Cl.
  CPC ..... *G06K 9/00355* (2013.01); *G06K 9/00248* (2013.01); *G06K 9/00281* (2013.01); *G06K 9/6232* (2013.01)

(58) Field of Classification Search
  CPC ........... G06K 9/00355; G06K 9/00281; G06K 9/6232; G06K 9/00248
  See application file for complete search history.

(56) References Cited

U.S. PATENT DOCUMENTS

| | | | |
|---|---|---|---|
| 7,565,295 | B1 | 7/2009 | Hernandez-Rebollar |
| 2013/0077820 | A1 | 3/2013 | Marais et al. |
| 2013/0113826 | A1 | 5/2013 | Miyazaki |
| 2014/0147035 | A1 | 5/2014 | Ding et al. |
| 2015/0154804 | A1* | 6/2015 | Wang ................. G06K 9/00315 345/633 |

(Continued)

OTHER PUBLICATIONS

International Search Report in the parent PCT application No. PCT/CN2020/045078, dated Nov. 24, 2020.

(Continued)

*Primary Examiner* — Matthew C Bella
*Assistant Examiner* — Kaleb Tessema
(74) *Attorney, Agent, or Firm* — Chen Yoshimura LLP

(57) ABSTRACT

A method for recognizing hand gestures when the hand is held in front of the user's upper body. The method detects dominant features associated with the upper body, including features on the face (eyes and mouth etc.) and the shoulder extremes. Geometrical relations among these features are used to judge whether the face/head has turned to the side relative to the shoulder. If not, a face-shoulder coordinate system is established using these face-shoulder features, and the hand images are transformed into this new coordinate system. This in effect defines hand gestures relative to the user's face and shoulder, thus significantly reducing the dimensions of the feature space for hand gestures. This face-shoulder coordinate transform can be combined either with traditional appearance-based hand gesture recognition methods, or with a conventional or hybrid deep neural network for RGB or RGB-D images.

20 Claims, 6 Drawing Sheets

(56) References Cited

U.S. PATENT DOCUMENTS

2015/0253863 A1* 9/2015 Babin .................. G06K 9/685
                                                    345/156
2015/0309581 A1* 10/2015 Minnen ................. G06F 3/017
                                                    345/156
2018/0307319 A1* 10/2018 Karmon ............ G06K 9/00389

OTHER PUBLICATIONS

Written Opinion in the parent PCT application No. PCT/CN2020/045078, dated Nov. 24, 2020.
Chen et al. "Upper Body Tracking for Human-Machine Interaction with a Moving Camera" The 2009 IEEE/RSJ International Conference on Intelligent Robots and Systems, Oct. 11-15, 2009, St. Louis, USA. Retrieved on Oct. 10, 2020 Retrieved from the Internet < URL: https://ieeexplore.ieee.org/document/5354053 >.
Murthy et al., "A Review of Vision Based Hand Gestures Recognition", International Journal of Information Technology and Knowledge Management, Jul.-Dec. 2009, vol. 2, No. 2, pp. 405-410.
Suarez et al., "Hand Gesture Recognition with Depth Images: A Review", 2012 IEEE RO-MAN: The 21st IEEE International Symposium on Robot and Human Interactive Communication, Sep. 9-13, 2012. Paris, France, pp. 411-417.
Hasan et al., "Hand Gesture Modeling and Recognition using Geometric Features: A Review", Canadian Journal on Image Processing and Computer Vision, vol. 3 No. 1, Mar. 2012, pp. 12-26.

* cited by examiner key face-shoulder features face-shoulder coordinate system (1) Center of $S_L$ and $S_R$ as the Origin O;
(2) (O, Mc) as direction of X;
(3) (O, $S_R$) as direction Y;
(4) Direction of Z is orthogonal to the plane ($S_L$, $S_R$, Mc)

ADAPTIVE HAND TRACKING AND GESTURE RECOGNITION USING FACE-SHOULDER FEATURE COORDINATE TRANSFORMS

BACKGROUND OF THE INVENTION

Field of the Invention

This invention relates to human-computer interface, and in particular, it relates to a system and method for adaptive hand tracking and gesture recognition.

Description of Related Art

Hand tracking and gesture recognition system is used to create interactions between a computer or machine and a human user where the recognized gestures of the human user can be used for controlling the machines or conveying information. It falls in the domain of human-computer interface (HCI) or human-machine interface (HMI).

One approach that satisfies the advanced requirements of hand gesture based HCI is glove-based sensing, which employs sensors (mechanical or optical) attached to a glove that converts finger flexions into electrical signals for determining the hand posture. This approach is not natural, as it requires the user to carry the special glove with wires, and to perform calibration and setup.

Another, more natural, approach is vision-based sensing, which uses a camera to capture the hand gesture. Hand gestures can be static (a posture) or dynamic (a sequence of postures). Natural hand gesture acquisition vision systems use either a color camera (referred to as RGB camera), a depth camera, or the combination of the two (referred to as RGB-D camera, which detects both color and depth information of a scene).

The methods for vision-based hand gesture recognition can be divided into model-based methods and appearance-based methods. Model-based methods generate 3D model hypotheses on hand gestures and evaluate them on the acquired images. This is fundamentally an optimization problem whose cost function measures the distance between the images that are expected due to a model hypothesis and the actual ones. Up to 28 degrees of freedom (DOF) have been used in various 3D hand gesture models, leading to significant computational burden on the model-to-image transformations and the optimization routine, although 3D inputs from a depth camera can significantly simplify the computation for model-based methods.

Appearance-based methods directly use the information contained in the images, and assume no explicit 3D hand model. When only the hand appearances are known, differentiating between gestures typically involves certain statistical classifiers using a set of image features of the hand, which can be extracted from either RGB or depth images of the hand, or the combination of the two. It should be noted that in recent years, deep neural networks (DNNs) have been widely used as image classifiers, and they are equivalent to traditional statistical classifiers with image feature detectors combined, but generally need more samples to train and can produce more robust classification results when it is done properly.

Due to person-to-person variations in hand appearances, gesture habits, and body orientation or movements, training a hand gesture classifier needs large amount of samples with ground truth, which in turn requires significant effort and cost in sample collections and annotations.

SUMMARY

For many HCI applications, when a person performs hand gestures, the hand is held in front of the upper body. There are some dominant features associated with the human upper body that are relatively easy and robust to detect, for example, the features on the face (eyes and mouth etc.), the shoulder extremes (approximately the upper and outer end point of each shoulder), etc. Based on such insight, in embodiments of the present invention, in the first step of hand tracking and gesture recognition, these features on the face and shoulder can be detected, and their geometrical relations can be used to judge whether the face/head has turned to the side relative to the shoulder. If not, a coordinate system can be established using these face-shoulder features, and the hand images are transformed into this new coordinate system. This essentially defines hand gestures relative to each user's face and shoulder, thus significantly reducing the dimensions of the feature space for hand gestures. This face-shoulder coordinate transform can be combined either with traditional appearance-based hand gesture recognition methods, or with a hybrid deep neural network for RGB-D images that carries out separate pre-processing of the depth image instead of the conventional convolution layers for RGB images.

An object of the present invention is to provide an improved hand tracking and gesture recognition method.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a method for hand tracking and gesture recognition which includes: receiving a current image from a camera system, the current image containing a face and shoulders of a human user; from the current image, detecting face and shoulder features of the user; establishing a current face-shoulder coordinate system based on the detected face and shoulder features; transforming a previous hand region of interest, which is a region of interest containing a hand of the user and which has been generated from a previous image received from the camera system, from a previous face-shoulder coordinate system into the current face-shoulder coordinate system to generate a transformed previous hand region of interest; extracting a current hand region of interest from the current image, wherein the current hand region of interest is defined in the current face-shoulder coordinate system; and performing gesture recognition using the transformed previous hand region of interest and the current hand region of interest in the current face-shoulder coordinate system.

In some embodiments, wherein the detecting step includes detecting the user's eyes, mouth and shoulders and computing current left and right eye center positions, a current mouth center position, and current left and right shoulder curvature extreme positions of the user, and wherein the establishing step includes establishing the current face-shoulder coordinate system based on the current left and right eye center positions, the current mouth center position, and the current left and right shoulder curvature extreme positions.

In another aspect, the present invention provides a computer program product comprising a computer usable non-transitory medium (e.g. memory or storage device) having a computer readable program code embedded therein for controlling a data processing apparatus (e.g. a computer), the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 1(a) shows an image acquisition and processing system; FIG. 1(b) shows calibration outputs of the RGB-D camera.

DETAILED DESCRIPTION OF PREFERRED EMBODIMENTS

The hand tracking and gesture recognition methods according to embodiments of the present invention are based on the inventors' insights and recognition of the fact and assumption that for many HCI applications, most of the time when a person performs hand gestures, the hand is held in front of the upper body. There are some dominant features associated with the human upper body that are relatively easy and robust to detect, for example, the features on the face (eyes, eyebrows, mouth and nose etc.), the shoulder extremes (approximately the upper and outer end point of each shoulder), etc. As such, in embodiments of the present invention, in the first step of hand tracking and gesture recognition, these features on the face and shoulder (called face-shoulder features in this disclosure) are detected, and their geometrical relations are used to judge whether the face/head has turned to the side relative to the shoulder. If not, a coordinate system (referred to as the face-shoulder coordinate system) is established using these face-shoulder features, and the hand images are transformed into this new coordinate system. This essentially defines hand gestures relative to each user's face and shoulder, thus significantly reducing the dimensions of the feature space for hand gestures. It is possible that one or two of the face-shoulder features is missing due to hand occlusion as the hand is most likely between the face-shoulder plane and the camera; in this case, the face-shoulder coordinate system can also be updated by matching those still visible face-shoulder features to historic records (previous image frames during the same gesture recognition session).

A key advantage of embodiments of this invention is to dramatically reduce the dimensions of the feature space for hand gestures, thus to (1) reduce the cost associated with hand gesture sample collection and annotation; (2) improve the robustness of hand tracking and the accuracy of hand gesture recognition; and (3) enable the adoption of simpler algorithms for hand tracing and gesture recognition.

Figure 1A:
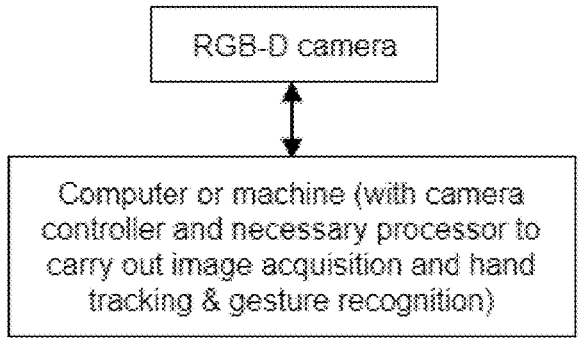
FIGS. 1(a) and 1(b) schematically illustrate a vision-based hand gesture acquisition system in which embodiments of the present invention may be implemented.

An implementation of the hand tracking and gesture recognition system of a preferred embodiment includes an RGB-D camera connected to a computer or machine (for simplicity, "machine" will be used in the remaining of this disclosure). The machine includes one or more processors and non-volatile memories that store machine executable program instructions, and/or logic circuits configured to process signals and data, to implement the hand tracking and gesture recognition methods described below. The machine may further include a display screen or speaker for displaying or otherwise convey information to the user. The machine also includes a camera controller and necessary processors that control the acquisition of images and carry out the computations as detailed below, both in real time (see FIG. 1(a)). RGB and depth information is complementary and can simplify the hand tracking and gesture recognition procedures and improve the robustness. However, it should be noted that the system can also be implemented with only an RGB camera or only a depth camera, with appropriate modifications to the methods described below. As an example, this disclosure uses RGB-D camera and the resulting RGB and depth images in the following descriptions.

Figure 1B:
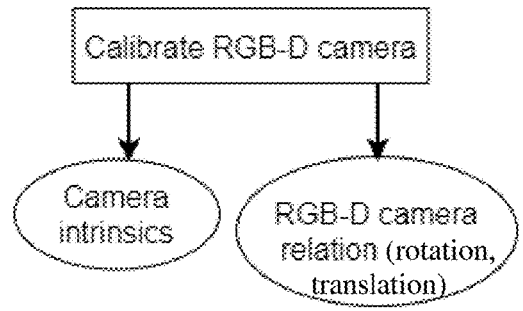

The RGB-D camera is calibrated prior to use to establish the intrinsic parameters of the individual RGB and depth cameras within the RGB-D camera and their spatial relationship (extrinsic parameters). The intrinsic parameters of a camera include, but are not limited to, focal length, principle point, radial and tangential distortions etc. The extrinsic parameters between the RGB and depth cameras include a rotation matrix and a translation vector (see FIG. 1(b)). Any suitable method may be used to perform the camera calibration, which are generally known to those skilled in the art.

Figure 2:
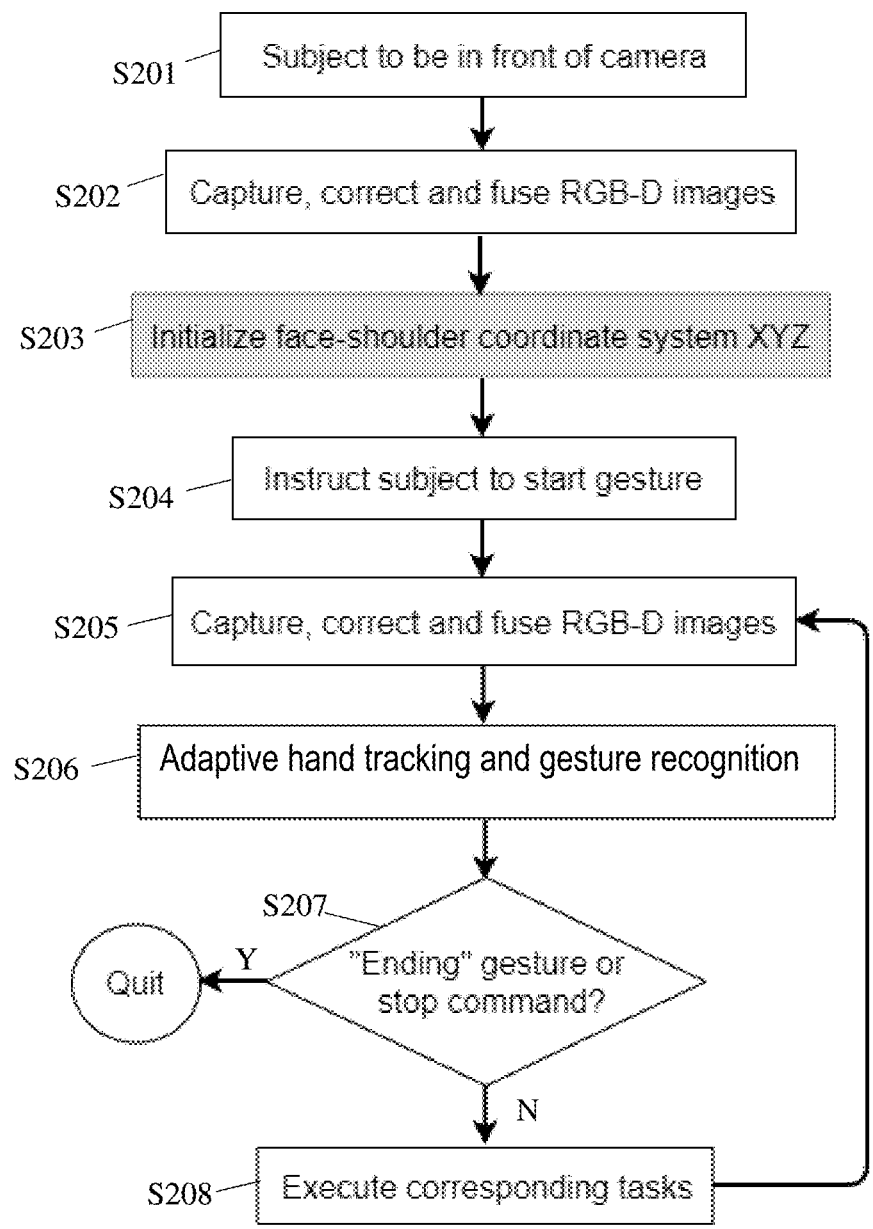
FIG. 2 is a flow chart that illustrates a hand tracking and gesture recognition process according to embodiments of the present invention.

The overall hand tracking and gesture recognition procedure according to embodiments of the present invention is shown in FIG. 2. While the subject (user) is positioned in front of the camera (step S201), RGB-D images are captured, corrected and aligned (step S202). Aligning (or fusing) of the RGB and depth images is done by using the rotation matrix and translation vector described above, to generate an RGB-D image pair. Then the face-shoulder coordinate system XYZ is initialized with features detected from the RGB-D image pair (step S203, details further described below). Afterwards, the machine instructs the subject to start gesturing to interact with the machine (step S204), and the system continuously captures RGB-D images (step S205) and carries out adaptive hand tracking and gesture recognition (step S206, details further illustrated below), until a predefined "ending" gesture is recognized or other stop command is received ("Y" in step S207). When no "ending" gesture is recognized and no other stop command is received ("N" in step S207), the system executes tasks corresponding to the recognized hand gesture according to pre-defined rules (step S208).

Figure 3:
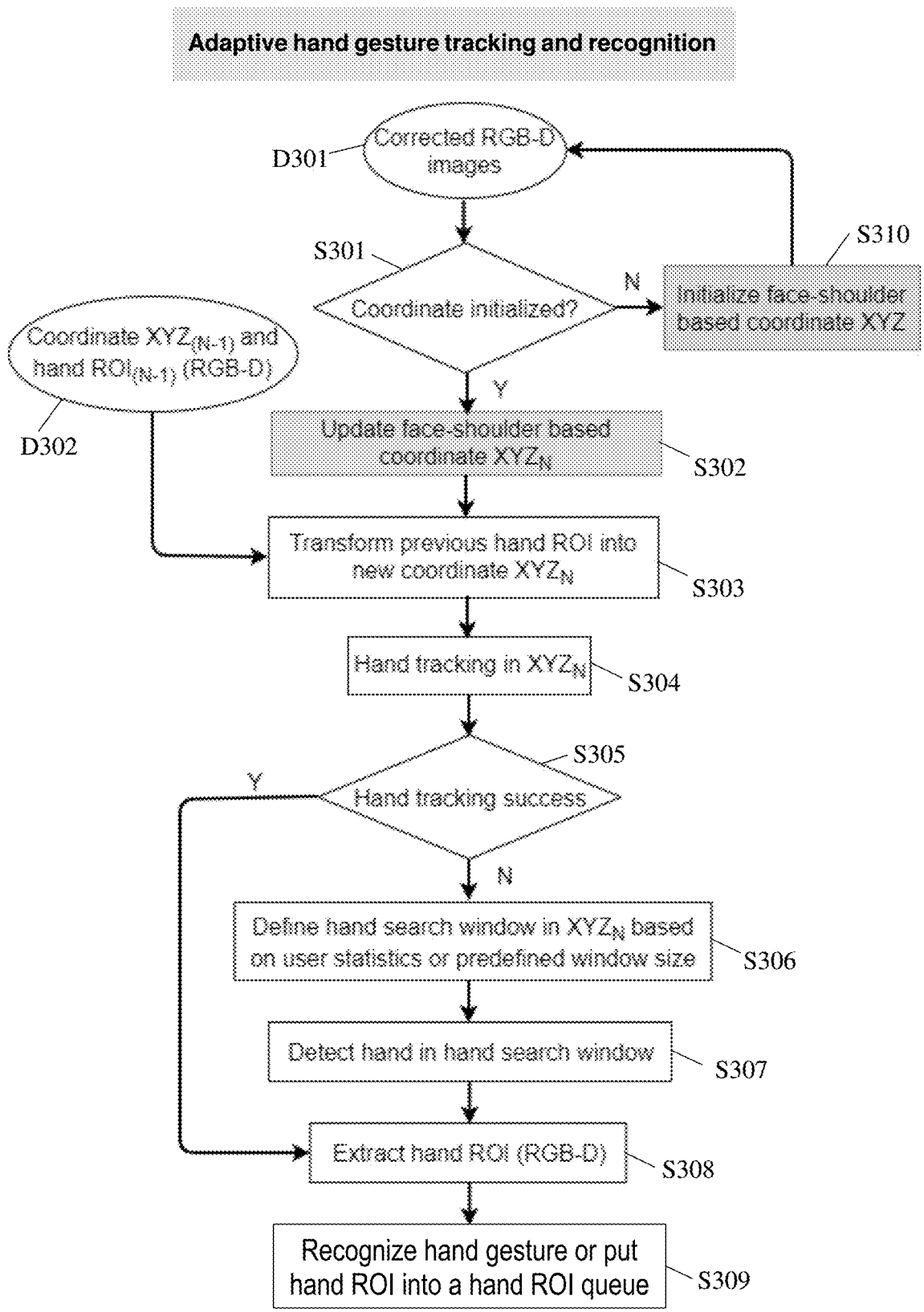
FIG. 3 is a flow chart that illustrates an adaptive hand tracking and gesture recognition process in the process shown in FIG. 2.

FIG. 3 illustrates the process (S206 in FIG. 2) of adaptive hand tracking and gesture recognition using face-shoulder feature coordinate transforms. The steps shown in FIG. 3 are performed for an N-th image. After the face-shoulder coordinate system initialization (step S310, or step S203 in FIG. 2), whenever a new (N-th, or "current") corrected and aligned RGB-D image pair is received (data D301, and "Y" in step S301), the system tries to update the face-shoulder coordinate system with image features from the current image pair to generate an updated (current) face-shoulder coordinate system $XYZ_N$ (step S302). The region of interest (ROI) that contains the hand in the previous ((N−1)-th) hand image pair (hand $ROI_{(N-1)}$ in data D302) is transformed from the previous face-shoulder coordinate system $XYZ_{(N-1)}$ to the updated face-shoulder coordinate system $XYZ_N$ (step S303), before conducting hand tracking and gesture recognition in the updated face-shoulder coordinate system (steps S304-S309). The transforming step S303 is performed by computing a transformation that transforms the previous face-shoulder coordinate system to the current face-shoulder coordinate system, and then applying the same transformation to the previous hand ROI, to generate the transformed previous hand ROI. This transforms the hand image pairs from different images ((N−1)-th and N-th) to the same coordinate system ($XYZ_N$) before applying hand tracking and gesture recognition, and effectively act as a normalization process to reduce the variations in the hand gesture due to body rotation or other body movements. It should be pointed out that, in preferred embodiments, the coordinate transform is done only when the face-shoulder rotation or other movement is consistent. For example, if only the head is rotated while the shoulder is not, the geometry relationship check among the features will detect it and the coordinate system update won't be carried out. In other words, in the preferred embodiments, step S303 includes first determining whether the face-shoulder rotation or other movement is consistent, and updating the face-shoulder coordinate system only when the face-shoulder rotation or other movement is consistent.

After the hand images are transformed to the updated face-shoulder coordinate system (step S303), hand tracking and gesture recognition may be implemented using any suitable algorithm, one example of which is shown in FIG. 3, steps S304-S309. In this example, hand tracking is first performed in the current face-shoulder coordinate system $XYZ_N$ (step S304) to attempt to generate a hand movement (translation and rotation) that moves the hand in the previous ((N−1)-th) hand ROI to the hand in the current (N-th) image. This tracking is performed in the current face-shoulder coordinate system $XYZ_N$ because the previous hand ROI has already been transformed into this coordinate system. If the hand tracking is successful ("Y" in step S305), the current hand ROI, i.e. the ROI in the current image that contains the user's hand, is extracted based on the tracking (step S308). This current hand ROI is defined in the current face-shoulder coordinate system. If the hand tracking is unsuccessful ("N" in step S305), a hand search window is defined in the current image based on user statistics or a predefined window size (step S306), the hand is detected in the hand search window using a suitable image recognition algorithm (step S307), and the current hand ROI is extracted from the current image based the detected hand (step S308). Then, hand gesture is recognized based on the hand ROIs from the current and one or more previous images, or the current hand $ROI_N$ is put in the hand ROI queue to be used for gesture recognition in subsequent iterations (step S309).

Note that in a simple hand tracking method, only a single previous ROI and the current ROI are needed to perform hand tracking. In more sophisticated tracking methods, multiple (two or more) previous ROIs are used for hand tracking. In the latter case, the multiple previous ROIs that have been put in the queue are transformed into the updated (current) face-shoulder coordinate system $XYZ_N$ in step S303 to perform tracking.

Figure 4:
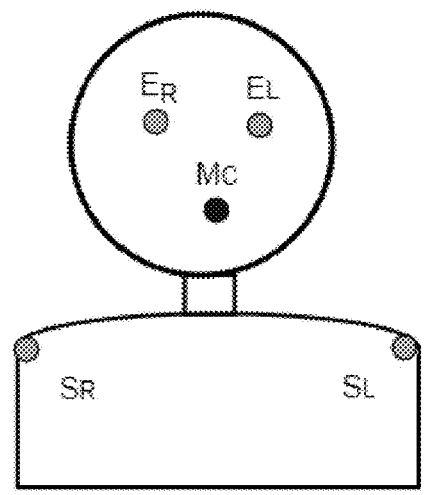
FIG. 4 schematically illustrates a face-shoulder coordinate, showing key face-shoulder features and the definition of a right-hand face-shoulder coordinate system.

The face-shoulder coordinate system is defined on some key features in the face-should region of the body, as shown in FIG. 4. The key features include the two eyes ($E_R$ and $E_L$) and the mouth ($M_C$), and the shoulder extremes ($S_R$ and $S_L$), which may be defined, for example, as the respective points in the shoulder outer profiles that have highest curvatures. In the case that one or both eyes are occluded by the hand, the corresponding one or both eyebrows can be used to replaces the one or both eyes, and in the case the mouth is occluded by the hand, the nose can be used to replace the mouth. For brevity, for all procedures described below, "eyes" can represent either the two eyes or the two eyebrows or one eye and one eyebrow, and "mouth" can represent either the mouth or the nose, though their detections may involve somewhat different algorithms. For establishing the face-shoulder coordinate system, only the center positions of these features are used. The replacement of eyes by eyebrows and mouth by nose only introduce very small error in the origin of the face-shoulder coordinate system and the impact can be ignored for the purpose of hand tracking and gesture recognition. Alternatively, position corrections may be applied before using the eyebrow or nose as the eye or mouth position, for example, based on certain assumptions about the average distances between the eyebrow and the eye and between the nose and the mouth. The face-shoulder coordinate system essentially assume the key features (or their centers) are in the same plane.

Figure 5:
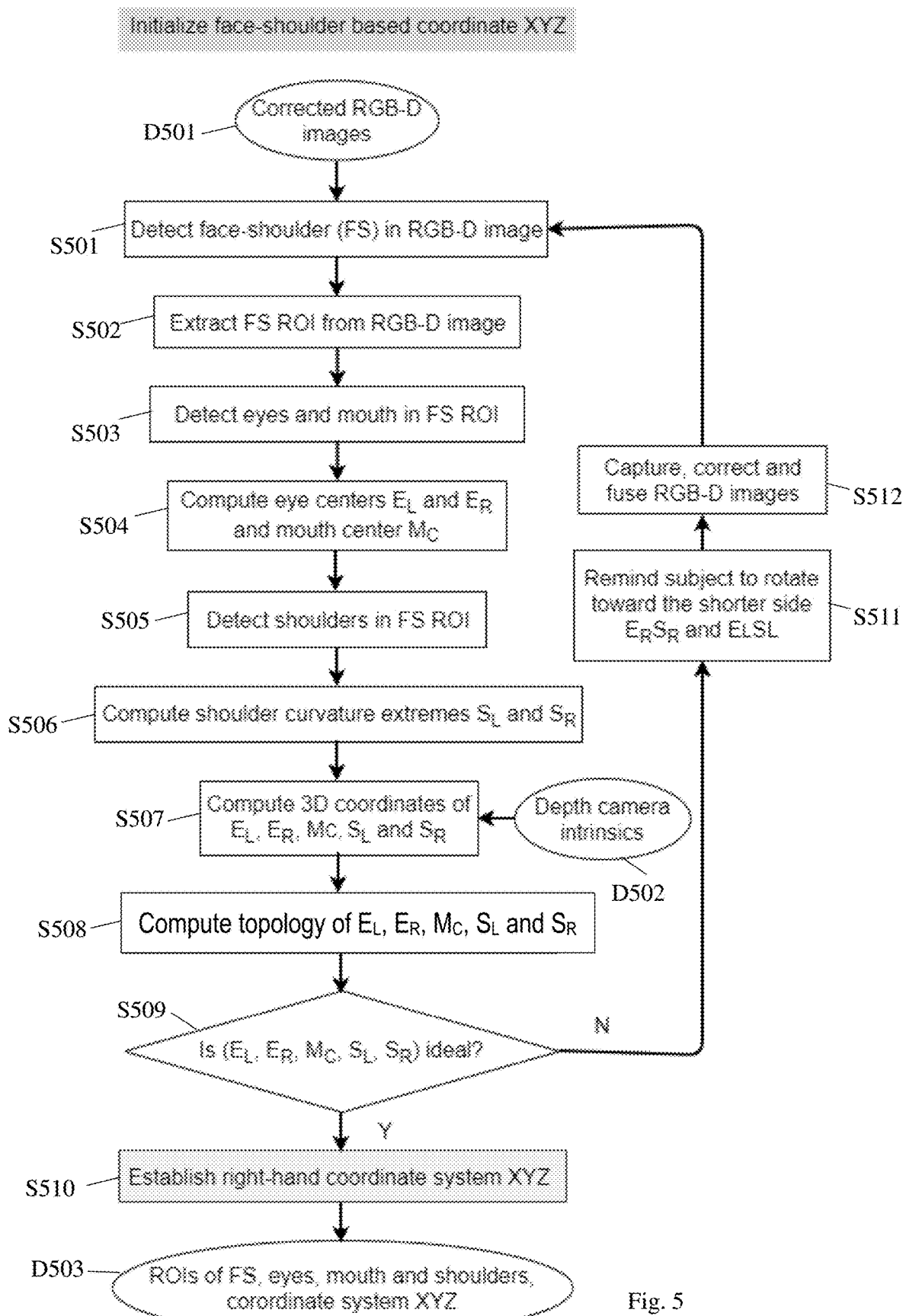
FIG. 5 is a flow chart that illustrates a face-shoulder coordinate system initialization process in the process shown in FIGS. 2 and 3.

FIG. 5 details how the face-shoulder coordinate system is initialized (step S203 of FIG. 2 and step S310 of FIG. 3). From the corrected RGB-D image pair (data D501), the process detects a face-shoulder (FS) feature in the RGB-D images (step S501), and extracts a corresponding face-shoulder regions of interest (FS ROI) from the RGB-D images (step S502). The process then detects the eyes and mouth in the extracted ROI (step S503), and computes the left and right eye centers $E_L$ and $E_R$ and the mouth center $M_C$ (step S504). The process also detects the shoulders in the extracted ROI (step S505), and computes the left and right shoulder curvature extremes $S_L$ and $S_R$ (step S506). The process computes the 3D coordinates of the eye centers $E_L$ and $E_R$, the mouth center $M_C$, and the shoulder curvature extremes $S_L$ and $S_R$ (step S507), based on the depth camera's intrinsic parameters (data D502). Note that these 3D coordinates are defined in the camera's coordinate system, not the face-shoulder coordinate system.

The process then computes a topology of the eye centers $E_L$ and $E_R$, the mouth center $M_C$, and the shoulder curvature extremes $S_L$ and $S_R$ (step S508), and determines whether the topology is ideal (step S509), in the following manner.

During this initialization stage, since the subject is instructed to face the camera in a generally front and centered position, the subject's face-shoulder plane is typically not rotated too far from a plane perpendicular to the camera's optical axis. The geometrical relationships of the five key feature centers are examined to confirm this. If the subject's body is not rotated too far from the perpendicular plane (perfect or near perfect orientation), the following ratios should be close to 1:

$$r_{LR} = \frac{E_R S_R}{E_L S_L} \quad (1)$$

$$r_{LRT} = \frac{E_R M_C}{E_L M_C} \quad (2)$$

$$r_{LRB} = \frac{S_R M_C}{S_L M_C} \quad (3)$$

The ratios within a certain range of 1 may be considered "ideal" (for example, the range can be chosen in such a way to guarantee the subject's face-shoulder plane is no more than 30 degrees rotated from the plane perpendicular to the camera's optical axis). This is to prevent the subject from facing the camera in substantially rotated fashion that may lead to hand tracking and gesture recognition problems. These initial topology ratios are recorded for future verification of whether the subject rotated his face relative to his shoulders. The ratios in Eqs. 1-3 are only an example of what may define a topology of the five key features; other parameters may be suitably used to define the topology of the five key features.

If the topology is ideal ("Y" in step S509), the positions of the eye centers $E_L$ and $E_R$, the mouth center $M_C$, and/or the shoulder curvature extremes $S_L$ and $S_R$ are used to establish an orthogonal face-shoulder coordinate system XYZ based on a set of pre-defined formulas (step S510). In one example (see FIG. 4), (1) the origin O of the face-shoulder coordinate system is defined to be the midpoint between the left and right shoulder curvature extremes $S_L$ and $S_R$, (2) the X direction is defined to be the (O, $M_C$) direction, (3) the Y direction is defined to be the (O, $S_R$) direction, and (4) the Z direction is defined as orthogonal to the plane defined by ($S_L$, $S_R$, $M_C$). The length unit may be defined based on the distance $E_L E_R$ or $S_L S_R$. Other suitable convention and formulas may also be used to define the face-shoulder coordinate system.

If the topology is not ideal ("N" in step S509), an instruction is displayed to remind the user to rotate toward the camera (step S511). For example, if $E_R S_R$ is longer than $E_L S_L$, the instruction will instruct the user to turn toward the right. Then, an RGB-D image is obtained (captured, corrected and fused) again (step S512), and steps S501 to S509 are repeated using the newly obtained RGB-D image to establish the face-shoulder coordinate system. This coordinate initialization process generates ROIs for the FS area, eyes, mouth and shoulders, as well as the face-shoulder coordinate system XYZ (data D503).

Figure 6:
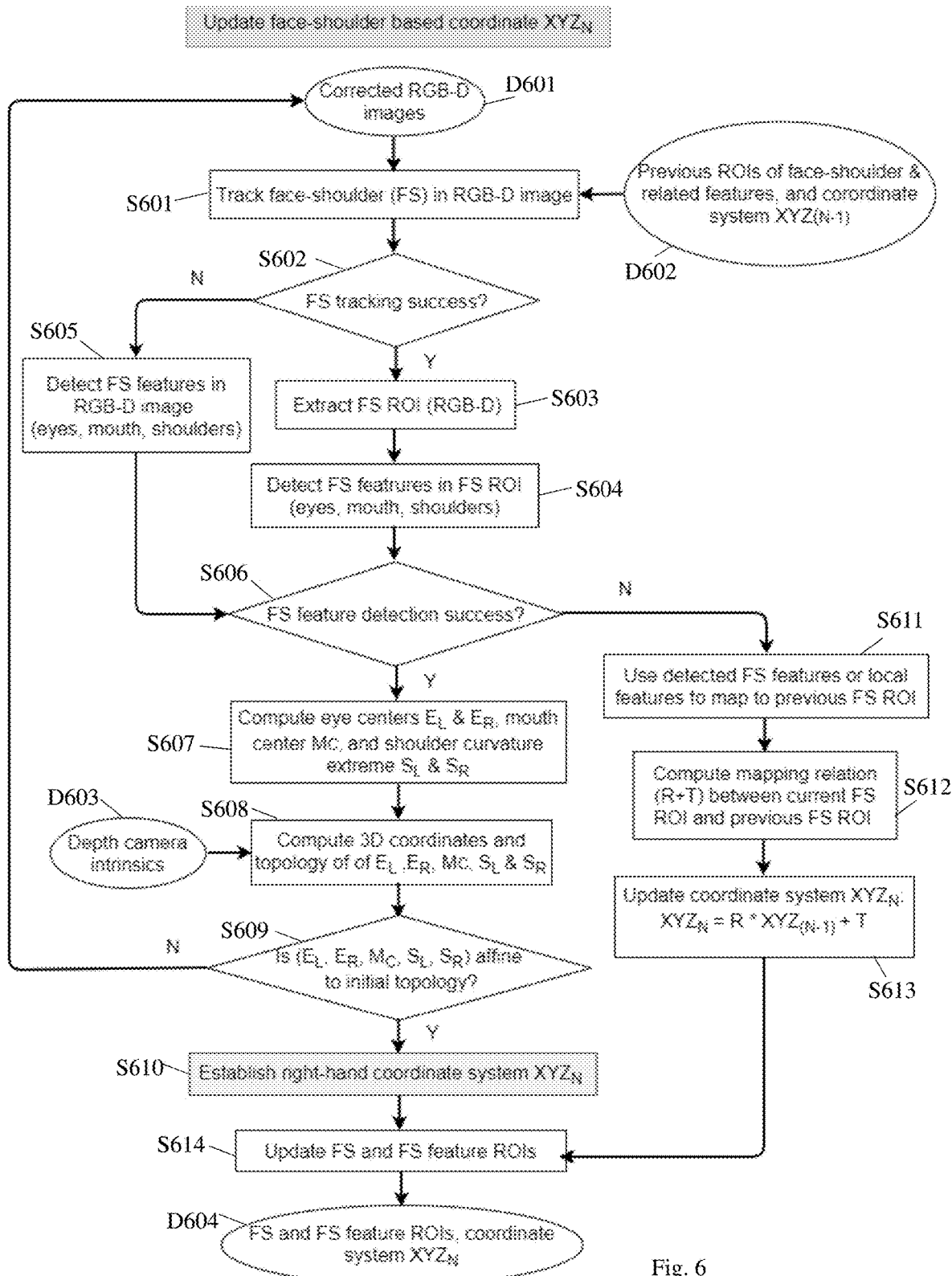
FIG. 6 is a flow chart that illustrates a face-shoulder coordinate system update process in the process shown in FIG. 3.

FIG. 6 details how the face-shoulder coordinate system is updated once the hand gesture interactions with the machine started (step S302 of FIG. 3). There are some important differences between update and initialization of the face-shoulder coordinate system. First, in the update process, the detections of face-shoulder features utilize tracking (step S601) whenever possible to quickly find the face-shoulder ROI to reduce the computation. Tracking is performed on the RGB-D image (data D601) using face-shoulder ROI and related features in the previous image (data D602), to attempt to generate a movement (translation and rotation) that moves the features in the previous image to the features in the current image. Based on successful tracking ("Y" in step S602), the FS ROI is extracted (step S603) and the FS features (eyes, mouth, shoulders) are detected in the FS ROI (step S604). If the tracking fails ("N" in step S602), the process falls back on the features (eyes, mouth, shoulders) alone to detect them in the entire image (step S605).

If the FS features (eyes, mouth, shoulders) are successfully detected ("Y" in step S606), the process computes the eye centers $E_L$ and $E_R$, the mouth center $M_C$, and the shoulder curvature extremes $S_L$ and $S_R$ (step S607), and computes the 3D coordinates (in the camera's coordinate system) of these five key features using the depth camera intrinsic parameters (data D603), as well as computing the topology of the five key features (step S608). In step S608, the topology is computed from the 3D coordinates using the same equations 1-3 as in step S508 of the initialization process.

A second difference between updating and initialization is that in updating, the key feature topology is checked whether it is affine transformation of the initial topology that was calculated in step S508 (step S609). Since it is assumed that the key features are in a plane, this can be done by simply respectively comparing the three ratios in Eq. 1-3 to see whether they are respectively equal to the three ratios of the initial topology within predefined thresholds. If the key feature topology is affine transformation of the initial topology ("Y" in step S609), the updated face-shoulder coordinate system $XYZ_N$ is established in a manner similar to step S510 (step S610).

A third difference between updating and initialization is that in updating, if the gesturing hand occlude one or more key face-shoulder features (note that since the eye and eyebrow on the same side is considered to be the same feature, if and only if both the eye and eyebrow on the same side is occluded, that feature is treated as occluded) ("N" in step S606), other successfully detected face-shoulder features or generic local image features (for example, SURF (speed up robust features), FAST (features from accelerated segment test), BRIEF (binary robust independent elementary features) and ORB (oriented FAST and rotated BRIEF), etc.) can be used to establish a mapping relationship (including a rotation matrix R and a translation vector T) that maps the previous face-shoulder ROI to the current face-shoulder ROI (steps S611 and S612), then the face-shoulder coordinate system can be updated with this relationship, by applying the same mapping (R and T) to the previous face-shoulder coordinate system $XYZ_{(N-1)}$, and the mapped face-shoulder coordinate system is used as the updated face-shoulder coordinate system $XYZ_{(N)}$ (step S613). In the special case where image feature mapping fails, mathematically it is equivalent to the rotation matrix R being an identity matrix and the translation vector being zero, thus the update of the face-shoulder coordinate system remains the same as the previous one.

After the updated face-shoulder coordinate system $XYZ_{(N)}$ is established in step S610 or S613, the FS ROI and FS feature ROIs are updated to the updated face-shoulder coordinate system (step S614), and the updated data is stored (data D604).

Figure 7:
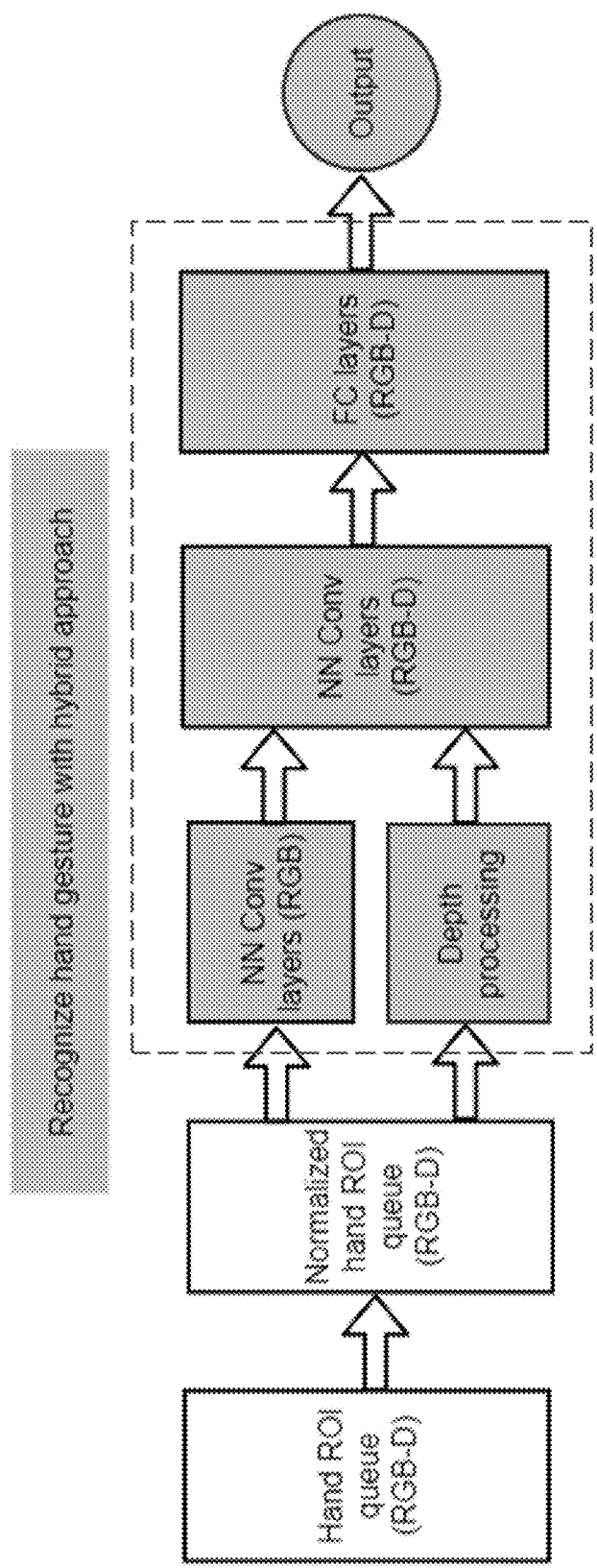
FIG. 7 schematically illustrates a hybrid hand gesture recognition method according to embodiments of the present invention.

Once the hand ROI is transformed into the adaptive face-shoulder coordinate, gesture recognition can be done using traditional appearance-based or model-based methods. In addition, hand gesture recognition can also be done using a hybrid deep neural network (DNN) as shown in FIG. 7, where the modules in the dashed-line box form the hybrid DNN. The depth component of the RGB-D is processed separately apart from the early convolution layers of the RGB component, as convolution is not an ideal way to extract the low-level features of depth image. The face-shoulder coordinate transform can significantly reduce the complexities of the DNN (with much fewer layers and parameters), and alleviate the burden of sample collections and annotations necessary to train the otherwise larger DNN, and reduce the training and prediction time significantly, making it easier to deploy on low-cost hardware platforms.

It will be apparent to those skilled in the art that various modification and variations can be made in the hand tracking and gesture recognition method and related apparatus of the present invention without departing from the spirit or scope of the invention. Thus, it is intended that the present invention cover modifications and variations that come within the scope of the appended claims and their equivalents.

What is claimed is:

1. A method for hand tracking and gesture recognition implemented in a computer system, comprising:
receiving a current image from a camera system, the current image containing a face and shoulders of a human user;
from the current image, detecting face and shoulder features of the user;
establishing a current face-shoulder coordinate system based on the detected face and shoulder features;
transforming a previous hand region of interest, which is a region of interest containing a hand of the user and which has been generated from a previous image received from the camera system, from a previous face-shoulder coordinate system into the current face-shoulder coordinate system to generate a transformed previous hand region of interest;
extracting a current hand region of interest from the current image, wherein the current hand region of interest is defined in the current face-shoulder coordinate system; and
performing gesture recognition using the transformed previous hand region of interest and the current hand region of interest in the current face-shoulder coordinate system.

2. The method of claim 1,
wherein the detecting step includes detecting the user's eyes, mouth and shoulders and computing current left and right eye center positions, a current mouth center position, and current left and right shoulder curvature extreme positions of the user, and
wherein the establishing step includes establishing the current face-shoulder coordinate system based on the current left and right eye center positions, the current mouth center position, and the current left and right shoulder curvature extreme positions.

3. The method of claim 2, wherein the establishing step includes:
defining an origin of the face-shoulder coordinate system to be a midpoint between the current left and right shoulder curvature extremes;
defining an X direction of the face-shoulder coordinate system to be a direction from the origin to the current mouth center; and
defining a Y direction of the face-shoulder coordinate system to be a direction from the origin to the current left or right shoulder curvature extreme; and
defining a Z direction of the face-shoulder coordinate system to be a direction orthogonal to a plane formed by the current left and right shoulder curvature extremes and the current mouth center.

4. The method of claim 2, further comprising, after the detecting step and before the establishing step:
computing a current topology of the current left and right eye center positions, the current mouth center position, and the current left and right shoulder curvature extreme positions; and
evaluating the current topology to confirm that a plane formed by the user's face and shoulder feature is within a predetermined angular range relative to an optical axis of the camera system.

5. The method of claim 2, further comprising, after the detecting step and before the establishing step:
computing a current topology of the current left and right eye center positions, the current mouth center position, and the current left and right shoulder curvature extreme positions; and
determining that the current topology is an affine transformation of an initial topology which has been computed from initial left and right eye center positions, an initial mouth center position, and initial left and right shoulder curvature extreme positions.

6. The method of claim 5, wherein each of the current topology and the initial topology is defined by three ratios including:

$$r_{LR} = \frac{E_R S_R}{E_L S_L} \quad (1)$$

$$r_{LRT} = \frac{E_R M_C}{E_L M_C} \quad (2)$$

$$r_{LRB} = \frac{S_R M_C}{S_L M_C} \quad (3)$$

where EL and ER are the current or initial left and right eye centers, MC is the current or initial mouth center, and SL and SR are the current or initial shoulder curvature extremes, and
wherein the current topology is determined to be an affine transformation of the initial topology when the three ratios of the current topology are respectively equal to the three ratios of the initial topology within predefined thresholds.

7. The method of claim 1, wherein the detecting step includes:
obtaining a previous face-shoulder region of interest, which is a region of interest in the previous image that contains the face and shoulders of the user;
tracking features in the previous face-shoulder region of interest to features in the current image;
extracting the current face-shoulder region of interest from the current image based on the tracking; and
detecting the user's eyes, mouth and shoulders in the current face-shoulder region of interest.

8. The method of claim 1, wherein the establishing step includes:
obtaining a previous face-shoulder region of interest, which is a region of interest in the previous image that contains the face and shoulders of the user, and a previous face-shoulder coordinate system which has been established for the previous image;
extracting a current face-shoulder region of interest, which is a region of interest in the current image that contains the face and shoulders of the user;
establishing a mapping that maps the previous face-shoulder region of interest to the current face-shoulder region of interest based on face-shoulder features or local image features in the respective face-shoulder regions of interest, the mapping including a rotation and a translation; and applying the mapping to the previous face-shoulder coordinate system to generate the current face-shoulder coordinate system.

9. The method of claim 1, wherein the step of extracting the current hand region of interest includes:
performing hand tracking in the current face-shoulder coordinate system using the transformed previous hand region of interest; and
extracting the current hand region of interest from the current image based on the hand tracking.

10. The method of claim 1, wherein the step of extracting the current hand region of interest includes:
defining a hand search window in the current image based on user statistics or a predefined window size;
detecting a hand in the hand search window; and
extracting the current hand region of interest from the current image based the detected hand.

11. A computer program product comprising a non-transitory computer readable storage medium having a computer readable program code embedded therein for controlling a computer, the computer readable program code configured to cause the computer to execute a process for hand tracking and gesture recognition, the process comprising:
receiving a current image from a camera system, the current image containing a face and shoulders of a human user;
from the current image, detecting face and shoulder features of the user;
establishing a current face-shoulder coordinate system based on the detected face and shoulder features;
transforming a previous hand region of interest, which is a region of interest containing a hand of the user and which has been generated from a previous image received from the camera system, from a previous face-shoulder coordinate system into the current face-shoulder coordinate system to generate a transformed previous hand region of interest;
extracting a current hand region of interest from the current image, wherein the current hand region of interest is defined in the current face-shoulder coordinate system; and
performing gesture recognition using the transformed previous hand region of interest and the current hand region of interest in the current face-shoulder coordinate system.

12. The computer program product of claim 11,
wherein the detecting step includes detecting the user's eyes, mouth and shoulders and computing current left and right eye center positions, a current mouth center position, and current left and right shoulder curvature extreme positions of the user, and
wherein the establishing step includes establishing the current face-shoulder coordinate system based on the current left and right eye center positions, the current mouth center position, and the current left and right shoulder curvature extreme positions.

13. The computer program product of claim 12, wherein the establishing step includes:
defining an origin of the face-shoulder coordinate system to be a midpoint between the current left and right shoulder curvature extremes;
defining an X direction of the face-shoulder coordinate system to be a direction from the origin to the current mouth center; and
defining a Y direction of the face-shoulder coordinate system to be a direction from the origin to the current left or right shoulder curvature extreme; and defining a Z direction of the face-shoulder coordinate system to be a direction orthogonal to a plane formed by the current left and right shoulder curvature extremes and the current mouth center.

14. The computer program product of claim 12, wherein the process further comprises, after the detecting step and before the establishing step:
computing a current topology of the current left and right eye center positions, the current mouth center position, and the current left and right shoulder curvature extreme positions; and
evaluating the current topology to confirm that a plane formed by the user's face and shoulder feature is within a predetermined angular range relative to an optical axis of the camera system.

15. The computer program product of claim 12, wherein the process further comprises, after the detecting step and before the establishing step:
computing a current topology of the current left and right eye center positions, the current mouth center position, and the current left and right shoulder curvature extreme positions; and
determining that the current topology is an affine transformation of an initial topology which has been computed from initial left and right eye center positions, an initial mouth center position, and initial left and right shoulder curvature extreme positions.

16. The computer program product of claim 15, wherein each of the current topology and the initial topology is defined by three ratios including:

$$r_{LR} = \frac{E_R S_R}{E_L S_L} \quad (1)$$

$$r_{LRT} = \frac{E_R M_C}{E_L M_C} \quad (2)$$

$$r_{LRB} = \frac{S_R M_C}{S_L M_C} \quad (3)$$

where EL and ER are the current or initial left and right eye centers, MC is the current or initial mouth center, and SL and SR are the current or initial shoulder curvature extremes, and
wherein the current topology is determined to be an affine transformation of the initial topology when the three ratios of the current topology are respectively equal to the three ratios of the initial topology within predefined thresholds.

17. The computer program product of claim 11, wherein the detecting step includes:
obtaining a previous face-shoulder region of interest, which is a region of interest in the previous image that contains the face and shoulders of the user;
tracking features in the previous face-shoulder region of interest to features in the current image;
extracting the current face-shoulder region of interest from the current image based on the tracking; and
detecting the user's eyes, mouth and shoulders in the current face-shoulder region of interest.

18. The computer program product of claim 11, wherein the establishing step includes:
obtaining a previous face-shoulder region of interest, which is a region of interest in the previous image that contains the face and shoulders of the user, and a previous face-shoulder coordinate system which has been established for the previous image;

extracting a current face-shoulder region of interest, which is a region of interest in the current image that contains the face and shoulders of the user;

establishing a mapping that maps the previous face-shoulder region of interest to the current face-shoulder region of interest based on face-shoulder features or local image features in the respective face-shoulder regions of interest, the mapping including a rotation and a translation; and applying the mapping to the previous face-shoulder coordinate system to generate the current face-shoulder coordinate system.

19. The computer program product of claim 11, wherein the step of extracting the current hand region of interest includes:

performing hand tracking in the current face-shoulder coordinate system using the transformed previous hand region of interest; and extracting the current hand region of interest from the current image based on the hand tracking.

20. The method of claim 11, wherein the step of extracting the current hand region of interest includes:

defining a hand search window in the current image based on user statistics or a predefined window size;

detecting a hand in the hand search window; and extracting the current hand region of interest from the current image based the detected hand.

* * * * *